(12) United States Patent
Azuchi

(10) Patent No.: US 8,797,408 B2
(45) Date of Patent: Aug. 5, 2014

(54) ELECTRONIC APPARATUS

(75) Inventor: Satoshi Azuchi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 13/267,700

(22) Filed: Oct. 6, 2011

(65) Prior Publication Data

US 2012/0162437 A1 Jun. 28, 2012

(30) Foreign Application Priority Data

Dec. 24, 2010 (JP) ................................. 2010-288833

(51) Int. Cl.
*H04N 7/18* (2006.01)
*H04N 5/225* (2006.01)
*H04N 7/14* (2006.01)

(52) U.S. Cl.
CPC ............. *H04N 5/2251* (2013.01); *H04N 7/142* (2013.01); *H04N 2007/145* (2013.01)
USPC .................................. 348/159; 348/E07.085

(58) Field of Classification Search
CPC   H04N 5/2251; H04N 7/142; H04N 2007/145
USPC .......................................................... 348/159
See application file for complete search history.

(56) References Cited

U.S. PATENT DOCUMENTS

2005/0255826 A1    11/2005  Wittenburg et al.
2007/0076245 A1     4/2007  Sugimoto et al.
2008/0316121 A1 *  12/2008  Hobson et al. ................ 343/702

FOREIGN PATENT DOCUMENTS

| JP | 2004-029559 A | 1/2004 |
| JP | 2004-228001 A | 8/2004 |
| JP | 2005-328541 | 11/2005 |
| JP | 2006-157897 | 6/2006 |
| JP | 2006-279796 A | 10/2006 |
| JP | 2006-303756 | 11/2006 |
| JP | 2007-251570 | 9/2007 |
| JP | 2008-203505 | 9/2008 |
| WO | WO 2005/093593 | 10/2005 |

OTHER PUBLICATIONS

Tablet News, written by Radu Iorga, titled "Dell Inspiron Duo Netbook/Tablet Hybrid Gets Appealing Promo (Video)", Nov. 5, 2010.*
engadget, by Joshua Topolsky, titled "iPhone 4 review", Jun. 22, 2010, http://www.engadget.com/2010/06/22/iphone-4-review/.*
Japanese Office Action for application No. 2010-288833 mailed on Nov. 29, 2011 in 6 pages.

* cited by examiner

*Primary Examiner* — Andy Rao
*Assistant Examiner* — Nguyen Truong
(74) *Attorney, Agent, or Firm* — Knobbe, Martens Olson & Bear, LLP

(57) ABSTRACT

According to one embodiment, an electronic apparatus includes a display including a display screen, a housing accommodating the display and including a surface configured to expose the display screen, a connector in an end portion of the housing, the connector being configured to be exposed to the outside of the housing, and a camera in the housing. The camera is configured to capture an image from the surface of the housing and eccentrically positioned with respect to a center portion of the housing as being shifted toward a side opposite to the end portion of the housing.

8 Claims, 9 Drawing Sheets

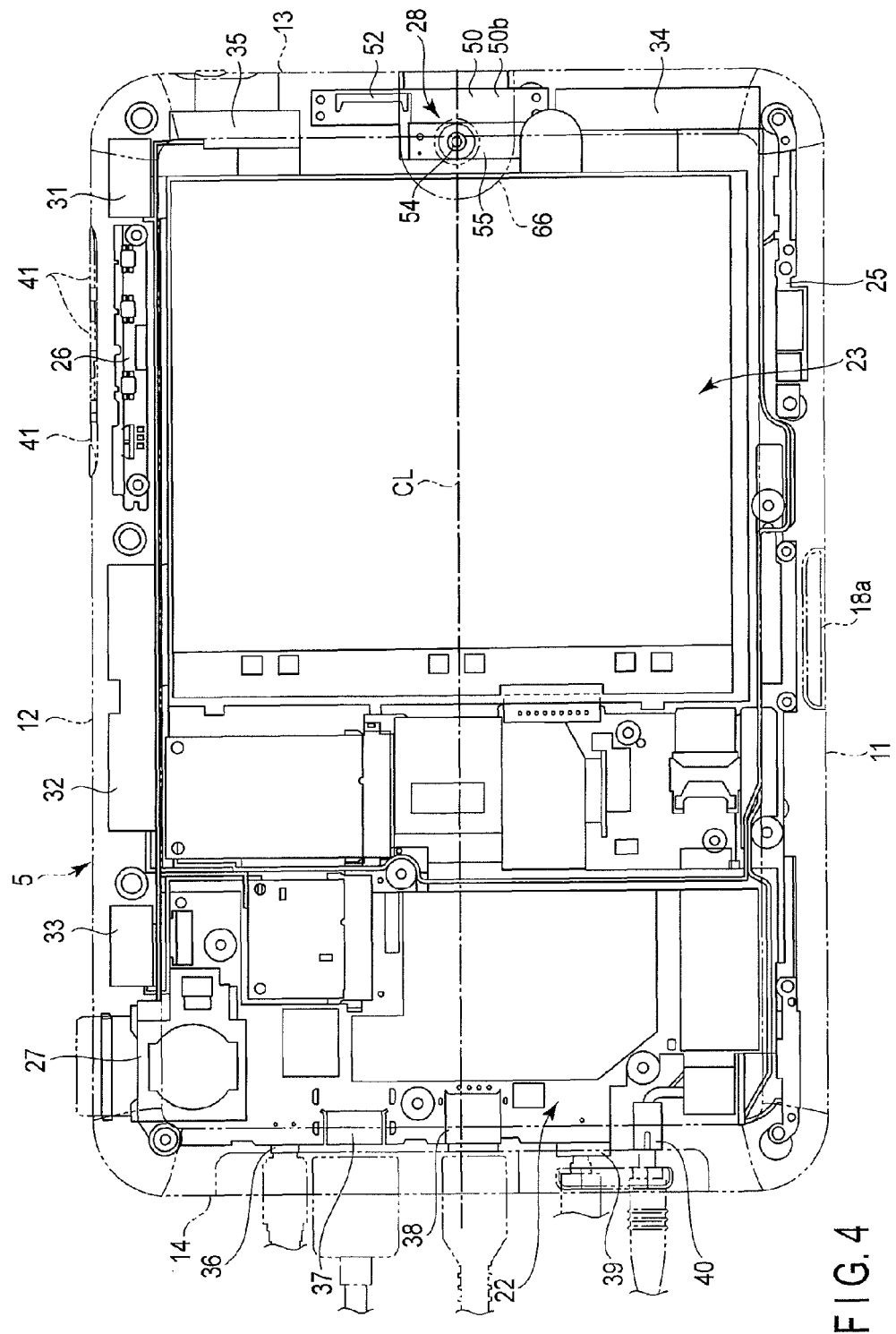
F I G. 4

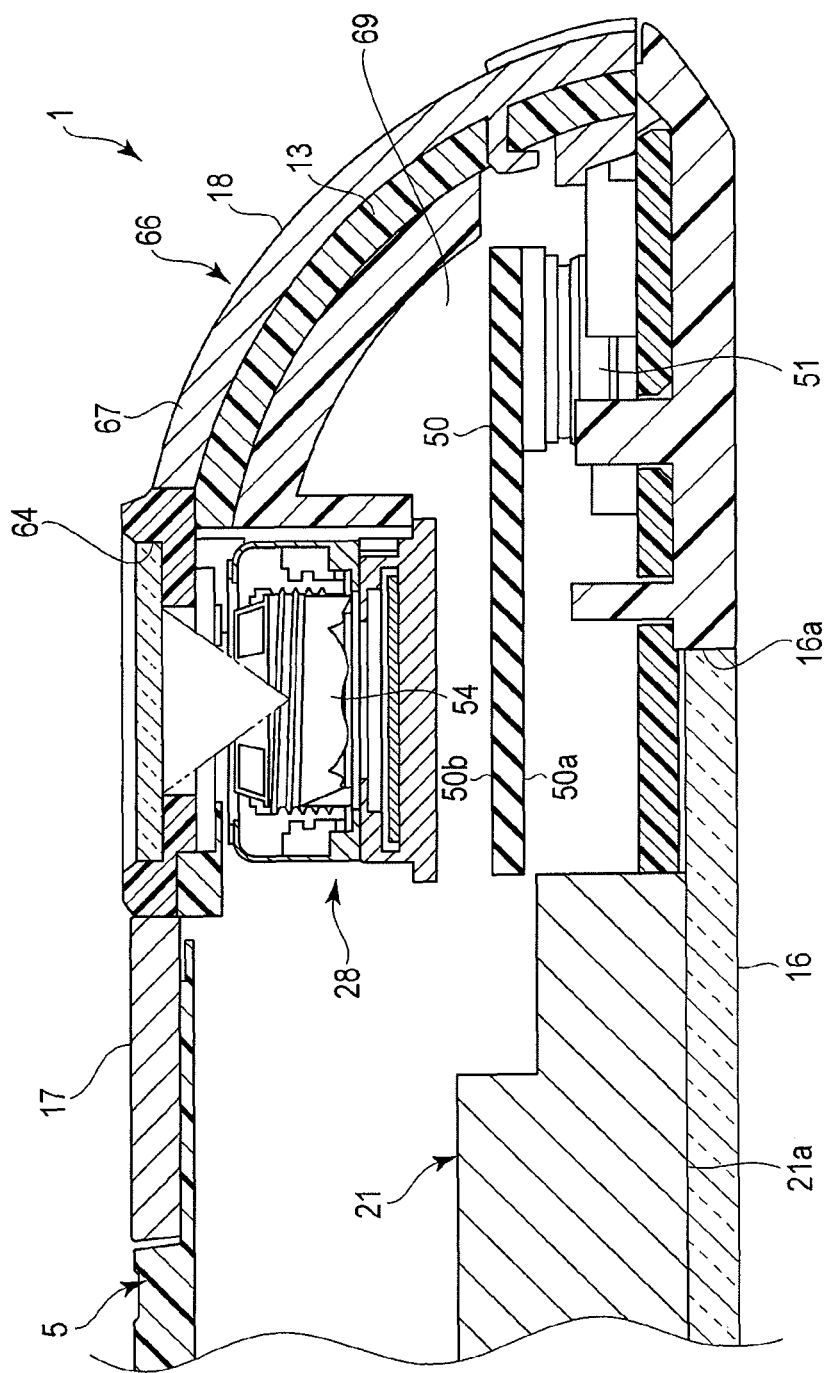
F I G. 9

ELECTRONIC APPARATUS

CROSS-REFERENCE TO RELATED APPLICATIONS

This application is based upon and claims the benefit of priority from Japanese Patent Application No. 2010-288833, filed Dec. 24, 2010; the entire contents of which are incorporated herein by reference.

FIELD

Embodiments described herein relate generally to an electronic apparatus including a camera.

BACKGROUND

There are electronic apparatuses including a camera.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary rear view illustrating the inner part of the electronic apparatus shown in FIG. 1;

FIG. 9 is an exemplary cross-sectional view taken along the A-A line of the electronic apparatus shown in FIG. 2;

DETAILED DESCRIPTION

Various embodiments will be described hereinafter with reference to the accompanying drawings.

In general, according to one embodiment, an electronic apparatus comprises a display comprising a display screen, a housing accommodating the display and comprising a surface configured to expose the display screen, a connector in an end portion of the housing, the connector being configured to be exposed to the outside of the housing, and a camera in the housing. The camera is configured to capture an image from the surface of the housing and eccentrically positioned with respect to a center portion of the housing as being shifted toward a side opposite to the end portion of the housing.

Hereinafter, embodiments will be described with reference to the drawings.

First Embodiment

FIGS. 1 to 9 illustrate an electronic apparatus 1 according to a first embodiment. The electronic apparatus 1 is a portable electronic apparatus, and is, for example, a slate portable computer (slate PC). The electronic apparatus 1 may be used, for example, while being held in user's hand.

An electronic apparatus to which the present embodiment can be applied is not limited to the electronic apparatus described above. The present embodiment can be broadly applied to various electronic apparatuses, such as a notebook personal computer, a cellular phone, a smart phone, a personal digital assistant (PDA), and a game machine.

Figure 1:
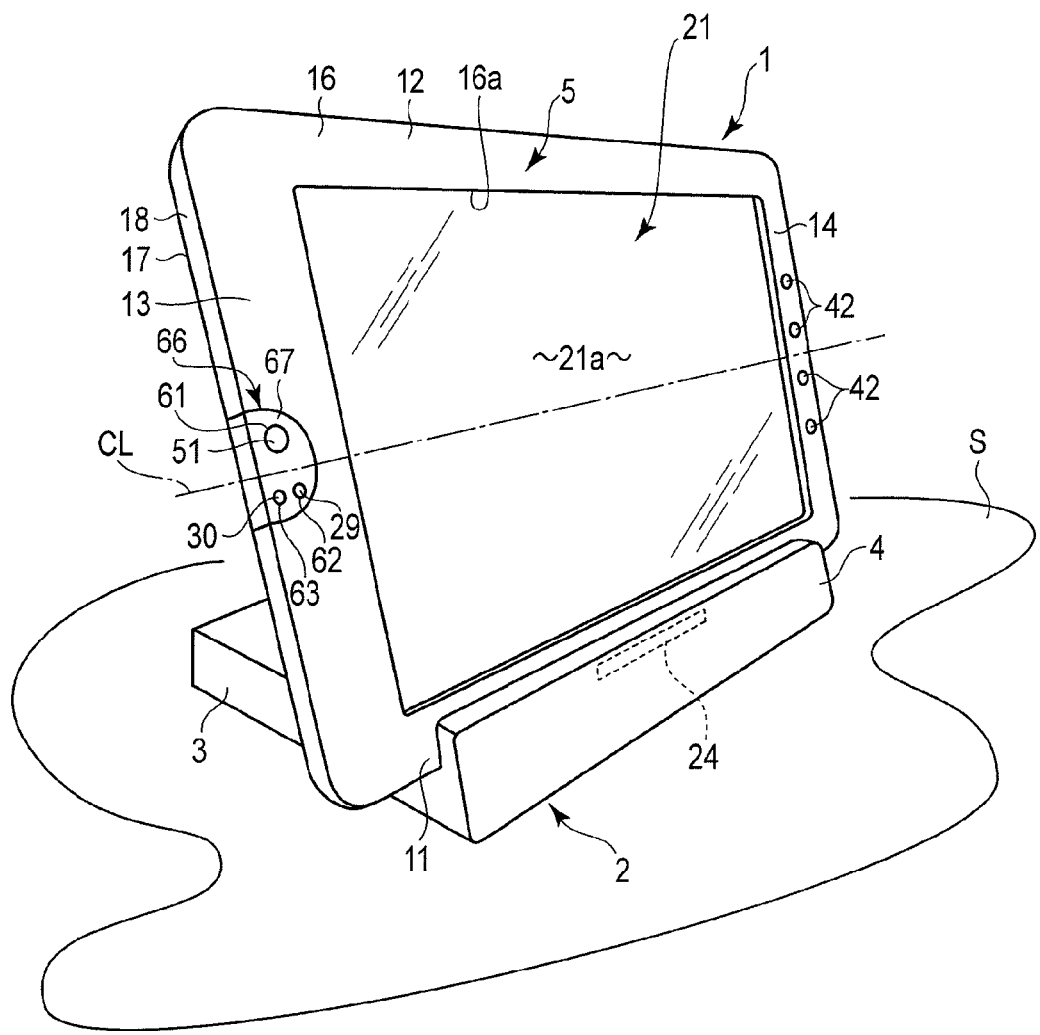
FIG. 1 is an exemplary perspective view of an electronic apparatus according to a first embodiment.

As shown in FIG. 1, the electronic apparatus 1 is detachably held on a dock 2. The dock 2 includes a main unit 3 and a holder 4. The main unit 3 includes, for example, an external connection terminal and a power supply portion that supplies power to the electronic apparatus 1. The holder 4 is disposed on the upper surface of the main unit 3 and configured to hold the electronic apparatus 1 thereon. The electronic apparatus 1 is held, for example, in a slanted state.

Figure 2:
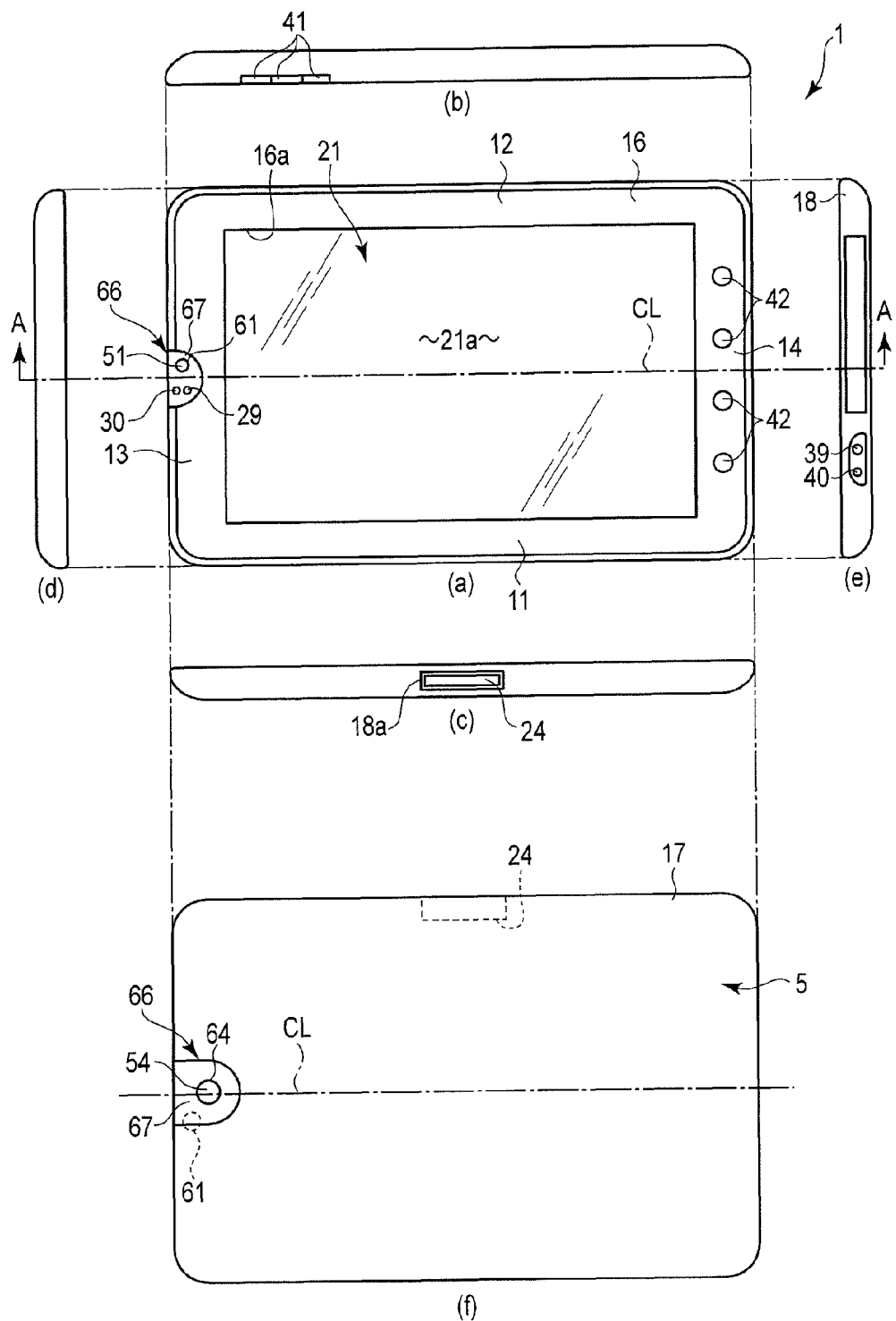
FIG. 2 is an exemplary view illustrating the electronic apparatus shown in FIG. 1.

FIG. 2 illustrates a plan view of the electronic apparatus 1 according to six directions. Specifically, (a), (b), (c), (d), (e), (f) of FIG. 2 are front, top, bottom, left, right and rear views of the electronic apparatus 1, respectively.

In this specification, the words "upper" and "lower" are defined based on the posture in which a housing 5 is held in the dock 2. Moreover, the directions "left" and "right" are defined as seen from the user. Furthermore, the side closer to the user is defined as "front" and the side farther from the user is defined as "rear."

As shown in FIG. 1 and FIG. 2, the electronic apparatus 1 includes the housing 5. The housing 5 has a flat rectangular shape with round corners. The housing 5 includes first to fourth end portions 11, 12, 13, and 14.

The first end portion 11 is an end portion configured to be detachably held in the holder 4 of the dock 2. The second end portion 12 is on the opposite side from the first end portion 11 and extends substantially in parallel to the first end portion 11. The third end portion 13 extends in a direction crossing (for example, a substantially perpendicular direction to) the first end portion 11. The fourth end portion 14 is on a side opposite to the third end portion 13 and extends in a direction substantially parallel to the third end portion 13. The third and fourth end portions 13 and 14 connect between the first and second end portions 11 and 12.

The first and second end portions 11 and 12 are end portions that extend in the longitudinal direction of the housing 5. The third and fourth end portions 13 and 14 are end portions that extend in the lateral direction of the housing 5 and are shorter than the first and second end portions 11 and 12.

As shown in FIG. 1, the first, second, third, and fourth end portions 11, 12, 13, and 14 become the lower, upper, left, and right end portions of the housing 5, respectively, when the housing 5 is held in the dock 2. The first and second end portions 11 and 12 are substantially horizontal when the housing 5 is held in the dock 2. The third and fourth end portions 13 and 14 are in a state of standing with respect to the surface S of a table.

As shown in FIG. 1 and FIG. 2, the housing 5 includes a front surface 16, a back surface 17, and a circumferential surface 18. A display 21 is accommodated in the housing 5. The display 21 includes a display screen 21a on which an image or a video is displayed. The display screen 21a may have an input function provided by a touch panel. The front surface 16 of the housing 5 includes an opening 16a, and the display screen 21a is exposed to the outside through the opening 16a.

The back surface 17 is on a side opposite to the front surface 16. The back surface 17 is smaller than the front surface 16. The circumferential surface 18 is formed in a curved shape that connects the peripheral portion of the front surface 16 and the peripheral portion of the back surface 17. The front surface 16 is an example of "first surface." The back surface 17 is an example of "second surface." The circumferential surface 18 is an example of "third surface."

Figure 3:
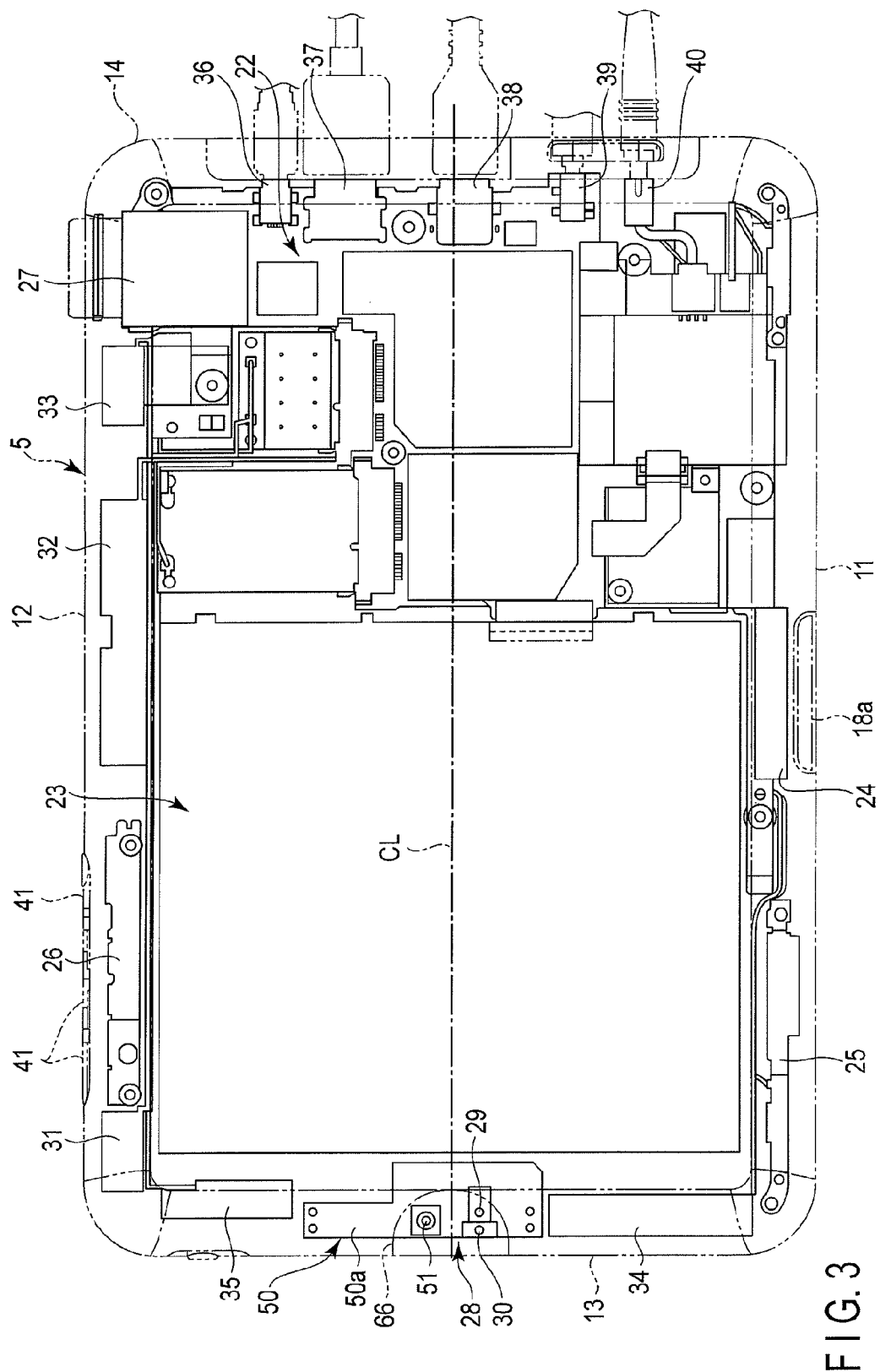
FIG. 3 is an exemplary plan view illustrating the inner part of the electronic apparatus shown in FIG. 1.

FIGS. 3 and 4 illustrate the layout of components in the inner part of the housing 5. As shown in FIGS. 3 and 4, accommodated in the housing 5 are a main circuit board 22, a battery 23, a docking connector 24, a vibration module 25, a switch module 26, a slot 27, a camera module 28, a microphone 29, an LED 30, a plurality of antennas 31, 32, 33, 34, and 35, and a plurality of connectors 36, 37, 38, 39, and 40.

The main circuit board 22 is disposed in a region close to the fourth end portion 14 within the housing 5. A central processing unit (CPU) and other electronic components are mounted on the main circuit board 22. The battery 23 is disposed in a region close to the third end portion 13 within the housing 5.

The docking connector 24 and the vibration module 25 are accommodated in the first end portion 11 of the housing 5. The circumferential surface 18 of the housing 5 includes an opening 18a which corresponds to the docking connector 24. The docking connector 24 is exposed to the outside of the housing 5 through the opening 18a.

The docking connector 24 is connected to the connector of the dock 2. The docking connector 24 is an example of a "connector." The connector formed in the first end portion 11 is not limited to the docking connector but may be other connectors. The vibration module 25 vibrates the electronic apparatus 1 at a predetermined time.

The switch module 26, three antennas 31, 32, and 33, and one slot 27 are accommodated in the second end portion 12 of the housing 5. The switch module 26 includes a circuit board and a plurality of switches mounted on the circuit board. The circumferential surface 18 of the housing 5 includes a plurality of buttons 41 which correspond to the switch modules 26. The electronic apparatus 1 receives various inputs when any one of the buttons 41 is pressed.

The antenna 31 is a W-LAN antenna. The antenna 32 is a third generation mobile communication (3G) antenna. The antenna 33 is a Bluetooth (trademark) antenna. The slot 27 is an SD card (trademark) slot.

The camera module 28 and two antennas 34 and 35 are accommodated in the third end portion 13 of the housing 5. The antenna 34 is a 3G antenna. The antenna 35 is a GPS antenna. The camera module 28 is disposed between the two antennas 34 and 35 and is disposed at the substantially center portion in the lateral direction of the housing 5. A detailed description of the camera module 28 will be provided later.

Five connectors 36, 37, 38, 39, and 40 are accommodated in the fourth end portion 14 of the housing 5. The connector 36 is a MiniUSB connector. The connector 37 is a high-definition multimedia interface (HDMI) connector. The connector 38 is a USB connector. The connector 39 is an audio connector. The connector 40 is a power connector. These connectors 37, 37, 38, 39, and 40 and the slot 27 are mounted on the main circuit board 22. As shown in FIG. 2, a plurality of buttons 42 for operating the electronic apparatus 1 is provided on the front surface 16 of the fourth end portion 14.

Next, the camera module 28 will be described in detail.

Figure 5:
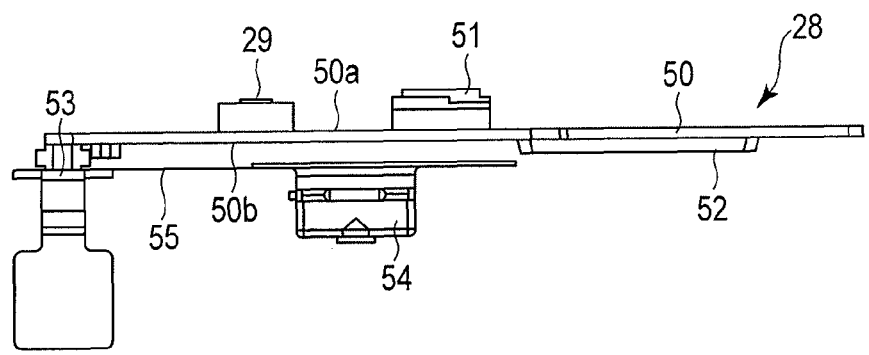
FIG. 5 is an exemplary front view of a camera module shown in FIG. 3.
Figure 6:
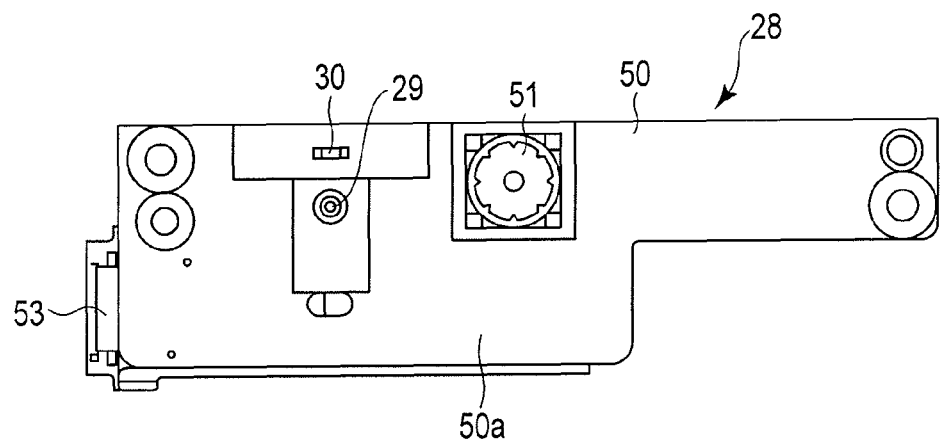
FIG. 6 is an exemplary plan view of the camera module shown in FIG. 3.
Figure 7:
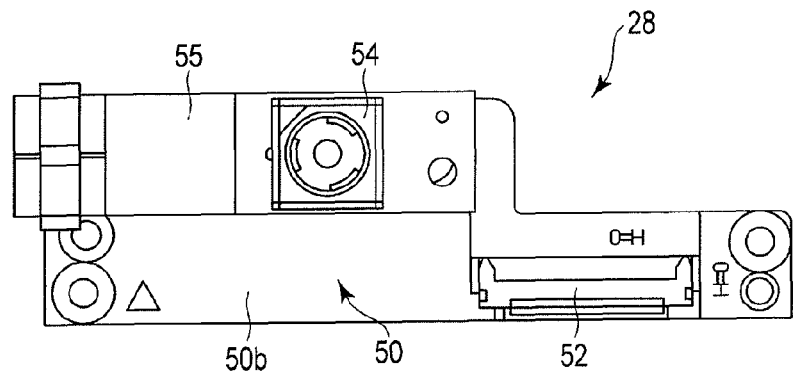
FIG. 7 is an exemplary rear view of the camera module shown in FIG. 3.

As shown in FIGS. 5 to 7, the camera module 28 includes a circuit board 50 (camera board), a first camera 51, a first connector 52, a second connector 53, a second camera 54, and a flexible printed circuit board 55. The circuit board 50 includes a first surface 50a and a second surface 50b on a side opposite to the first surface 50a. The first surface 50a faces the inner surface of the front surface 16 of the housing 5. The first camera 51, the microphone 29, and the LED 30 are mounted on the first surface 50a.

The first connector 52 and the second connector 53 are mounted on the second surface 50b. A flexible printed circuit board connecting the circuit board 50 to the main circuit board 22 is connected to the first connector 52.

The second camera 54 is not mounted directly on the circuit board 50 but is disposed apart from the circuit board 50. The second camera 54 is connected to the second connector 53 of the circuit board 50 by the flexible printed circuit board 55. In this way, the two cameras 51 and 54 are controlled by one circuit board 50. Moreover, the height of the electronic components mounted on the second surface 50b is lower than those of the first and second connectors 52 and 53.

As shown in FIGS. 1 to 4, a first camera hole 61, a microphone hole 62, and a display hole 63 are formed on the front surface 16 of the housing 5. The first camera hole 61 is formed so as to correspond to the first camera 51. The first camera 51 faces the first camera hole 61 and captures an image through the first camera hole 61 from the front surface 16. The microphone hole 62 is formed so as to correspond to the microphone 29. The microphone 29 faces the microphone hole 62 and collects sound through the microphone hole 62 from the front surface 16. The display hole 63 is formed so as to correspond to the LED 30. The LED 30 faces the display hole 63 and is exposed from the front surface 16 through the display hole 63.

The first camera 51 and the microphone 29 may face a user and collect the video or sound of the user facing the display screen 21a. The first camera 51 and the microphone 29 collect video or sound for making a video call (television call) of Skype (trademark), for example. The use of the first camera 51 is not limited to the purpose described above. The first camera 51 may capture an image of the user's face in order to authenticate the user based on the face image during the login of the electronic apparatus 1, for example. The first camera 51 also may be used for other purposes. The LED 30 glows or flashes in a predetermined color to thereby inform the user that the first camera 51 is operating.

A second camera hole 64 is formed on the back surface 17 of the housing 5. The second camera hole 64 is formed so as to correspond to the second camera 54. The second camera 54 faces the second camera hole 64 and captures an image through the second camera hole 64 from the back surface 17. The second camera 54 is larger than the first camera 51 and has a higher resolution than the first camera 51. The second camera 54 has a resolution of 5 megapixels, for example. The first camera 51 has a resolution of 2 megapixels, for example. The second camera 54 can be used, for example, for the purposes of capturing images or videos sharper than those captured by the first camera 51. The first and second cameras 51 and 54 are not limited to the functions described above.

As shown in FIGS. 3 and 4, the circuit board 50 and the second camera 54 of the camera module 28 are disposed at the substantially center portion between the first and second end portions 11 and 12 of the housing 5. That is, the circuit board 50 and the second camera 54 of the camera module 28 are disposed at the substantially center portion in the vertical direction of the housing 5 when the housing 5 is held on the dock 2. The expression "being disposed at the substantially center portion" means that a part of the circuit board 50 and a part of the second camera 54 overlap the central line CL traversing a region between the first and second end portions 11 and 12, when the housing 5 is viewed in a plan view, for example.

On the other hand, the first camera 51, the microphone 29, and the LED 30 are eccentrically disposed with respect to the center portion between the first and second end portions 11 and 12 of the housing 5. The expression "being eccentrically disposed with respect to the center portion" means that the first camera 51, the microphone 29, and the LED 30 do not overlap the central line CL traversing the region between the first and second end portions 11 and 12, when the housing 5 is viewed in a plan view, for example.

The first camera 51 is eccentrically disposed with respect to the center portion of the housing 5 as being shifted toward the side opposite to the first end portion 11 where the docking connector 24 is formed. Specifically, the first camera 51 is disposed in the circuit board 50 eccentrically with respect to the center portion between the first and second end portions 11 and 12 as being shifted toward the second end portion 12.

More specifically, for example, if "central region" is a broader concept of "center portion," the second camera 51 is disposed in the central region between the first and second end portions 11 and 12. However, within the central region, the first camera 51 is disposed at a position shifted toward the second end portion 12 from the center portion of the central region. That is, the first camera 51 is slightly shifted from the center portion rather than being shifted greatly from the center portion between the first and second end portions 11 and 12. The first camera 51 is disposed closer to the central line CL crossing between the first and second end portions 11 and 12 than the second end portion 12.

The microphone 29 and the LED 30 are disposed in the circuit board 50 while shifted toward the first end portion 11 with respect to the center portion between the first and second end portions 11 and 12. That is, the microphone 29 and the LED 30 are eccentrically disposed as being shifted toward the side opposite to the first camera 51. The central line CL of the housing 5 passes between the microphone 29 and LED 30, and the first camera 51.

In other words, a camera portion 66, which includes the two cameras 51 and 54, the microphone 29, and the LED 30, is provided in the third end portion 13 of the electronic apparatus 1. The camera portion 66 is provided at the substantially center portion between the first and second end portions 11 and 12 of the electronic apparatus 1. The second camera 54 is formed at the center portion of the camera portion 66. The first camera 51 is eccentrically disposed, in the camera portion 66, with respect to the center portion of the camera portion 66 as being shifted toward the second end portion 12. A decorative member 67 having a color or shape different from those of the other regions is mounted on the camera portion 66 of the present embodiment so that the user can recognize the region where a camera is mounted.

Figure 8:
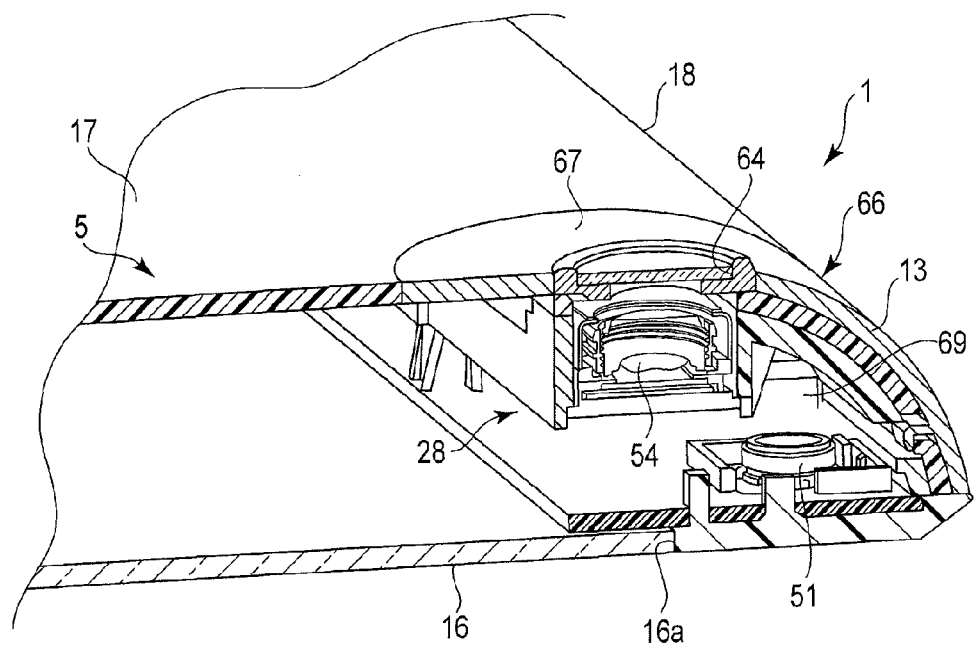
FIG. 8 is an exemplary cross-sectional view taken along the A-A line of the electronic apparatus shown in FIG. 2.

FIGS. 8 and 9 are cross-sectional views of the housing 5 taken along the central line CL. The circuit board 50 is not illustrated in FIG. 8 for convenience's sake. As shown in FIGS. 8 and 9, a fan-shaped portion 69 which is surrounded by the circular arc-shaped circumferential surface 18 and the front surface 16 is formed in the end portion of the housing 5. The first camera 51 is provided in the fan-shaped portion 69 and is disposed between the front surface 16 and the circumferential surface 18.

On the other hand, the second camera 54 is provided at a position apart from the fan-shaped portion 69 so as to be away from the curved circumferential surface 18. The second camera 54 is disposed between the front surface 16 and the back surface 17. That is, the second camera 54 is disposed closer to the center portion in the longitudinal direction of the housing 5 than the first camera 51. In other words, the second camera 54 is disposed along the central line CL as shifted toward the center portion in the longitudinal direction of the housing 5 from the first camera 51.

According to such a configuration, the imaging position of the camera can be optimized. That is, the electronic apparatus 1 of the present embodiment includes the connector 24 provided at the end portion 11 of the housing 5, and the camera 51 capturing an image from the surface 16 and being eccentrically disposed with respect to the center portion of the housing 5 as being shifted toward the side opposite to the end portion 11 where the connector 24 is provided. With this configuration, the camera 51 can be positioned closer to the user's face than the center portion of the housing 5. Thus, it is possible to capture a sharper image of the user's face.

In the present embodiment, the electronic apparatus 1 includes the first camera 51 capturing an image from the front surface 16, the circuit board 50 on which the first camera 51 is mounted, and the second camera 54 capturing an image from the back surface 17. The circuit board 50 and the second camera 54 are disposed to be confined at the substantially center portion in the height direction of the housing 5. With this configuration, components associated with the first camera 51 and components associated with the second camera 54 can be disposed to be close to each other, whereby high-density mounting can be realized.

In the present embodiment, in addition to the realization of the high-density mounting, the first camera 51 is disposed on the upper side than the center in the height direction of the housing 5 so that the first camera 51 is positioned close to the face of the user, thereby improving the photographing properties of the first camera 51. Moreover, if the first and second cameras 51 and 54 are disposed at close positions on the front and back surfaces of the housing 5, the user can easily recognize the region as the camera portion 66, and the usability may improve.

In other words, various design restrictions are imposed on the layout of components in order to enhance the design properties of the electronic apparatus 1. Therefore, in the electronic apparatus 1, the two cameras 51 and 54, the microphone 29, and the LED 30 are confined in one location and mounted in the center portion in the lateral direction of the housing 5 as the camera portion 66. If the camera portion 66 is mounted in the center portion in the lateral direction, since the camera portion 66 is positioned at the center portion in the left and right direction of the housing 5 even when the electronic apparatus 1 is used in a state of being held vertically, for example, so that the usability improves.

In the present embodiment, for the reasons described above, in the electronic apparatus 1 including the camera portion 66, the first camera 51 is disposed in the camera portion 66 and is shifted closer to the second end portion 12 than the center portion of the camera portion 66. With this configuration, it is possible to improve the design properties and the usability and to make the first camera 51 be positioned closer to the user when the electronic apparatus 1 is held on the dock 2, thereby further improving the photographing properties of the first camera 51.

In the present embodiment, the microphone 29 collecting sound from the front surface 16 and the LED 30 showing the operation state of the first camera 51 are provided. In the circuit board 50, the microphone 29 and the LED 30 are provided in the lower side than the center portion in the height direction of the housing 5. That is, the first camera 51 and the microphone 29 and LED 30 are disposed apart from each other at upper and lower portions with respect to the center portion in the height direction of the housing 5, and outward balance improves. This contributes to improvement in the design properties of the electronic apparatus 1.

The LED 30 is not limitedly used to indicate the operation status of the first camera 51 but may be used for illuminating a subject. For example, the LED 30 illuminating a subject (for example, a user) improves the photographing properties of the first camera 51.

In the present embodiment, the second camera 54 is connected to the flexible printed circuit board 55 and the circuit board 50. With this configuration, since the second camera 54 can be controlled by the circuit board 50 that also controls the first camera 51, it is not necessary to provide an independent circuit board for the second camera 54. This contributes to realizing a low profile and high-density mounting of the electronic apparatus 1.

In the present embodiment, the back surface 17 is smaller than the front surface 16, and the housing 5 includes the curved circumferential surface 18 that connects the peripheral portion of the front surface 16 and the peripheral portion of the back surface 17. This improves the design properties of the electronic apparatus 1. In the present embodiment, the first camera 51 is disposed in a fan-shaped space between the front surface 16 and the circumferential surface 18. With this configuration, the first camera 51 can be disposed to be close to an end portion of the housing 5, and the inner space of the housing 5 can be efficiently used.

In the present embodiment, the second camera 54 is disposed between the front surface 16 and the back surface 17. With this configuration, the two cameras 51 and 54 can be mounted at a position away from the curved circumferential surface 18.

In the present embodiment, the second camera 54 is larger than the first camera 51. That is, the first camera 51 having a relatively small size is disposed near the end portion of the housing 5 in which the curved circumferential surface 18 is present and a mounting space is limited, and the second camera 54 having a relatively large size is disposed to be shifted toward the central side of the housing 5 with respect to the first camera 51. With this configuration, the second camera 54 can be accommodated in a relatively thick portion of the housing 5. In other words, it is possible to realize a low-profile housing 5 without being greatly affected by the size of the second camera 54.

In the present embodiment, the first camera 51, the circuit board 50, and the second camera 54 are accommodated in the third end portion 13 of the housing 5. With this configuration, the space of the remaining three end portions 12, 13, and 14 can be used for mounting modules other than the camera, and higher-density mounting of the electronic apparatus 1 can be realized.

In the present embodiment, a plurality of connectors 36, 37, 38, 39, and 40 are disposed in the fourth end portion 14 of the housing 5. With this configuration, the fourth end portion 14 does not have an enough space for mounting the camera module 28 in a plan view. In other words, in the present embodiment, the first camera 51, the circuit board 50, and the second camera 54 are mounted to be confined in the third end portion 13 of the housing 5, so that a space for mounting the connectors 36, 37, 38, 39, and 40 is secured in the fourth end portion 14. For example, the fourth end portion 14 is the right end portion of the housing 5, and right-handed users, for example, can easily connect a cable to the right end portion of the housing 5.

In the present embodiment, a plurality of antennas 31, 32, and 33 are disposed in the second end portion 12 of the housing 5. With this configuration, the second end portion 12 does not have an enough space for mounting the camera module 28 in a plan view. In other words, in the present embodiment, the first camera 51, the circuit board 50, and the second camera 54 are mounted to be confined in the third end portion 13 of the housing 5, so that a space for mounting the antennas 31, 32, and 33 is secured in the second end portion 12. For example, the second end portion 12 is the upper end portion of the housing 5. When the antennas 31, 32, and 33 are disposed in the upper end portion of the housing 5, the reception sensitivity of the antenna may improve easily.

In the present embodiment, the housing 5 is held on the dock 2 in a state where the end portions 11 and 12 extending in the longitudinal direction of the housing 5 are oriented substantially horizontally. With this configuration, since the housing 5 is mounted on the dock 2 in a state where the longitudinal direction of the housing 5 is oriented substantially horizontally, the housing 5 can be maintained stably on the dock 2.

Second Embodiment

Next, an electronic apparatus 1 according to a second embodiment will be described with reference to FIGS. 10 and 11. Configurations having the same or similar functions as those of the configurations of the first embodiment will be denoted by the same reference numerals, and description thereof will not be repeated. Configurations other than those described below are the same as those of the first embodiment.

Figure 10:
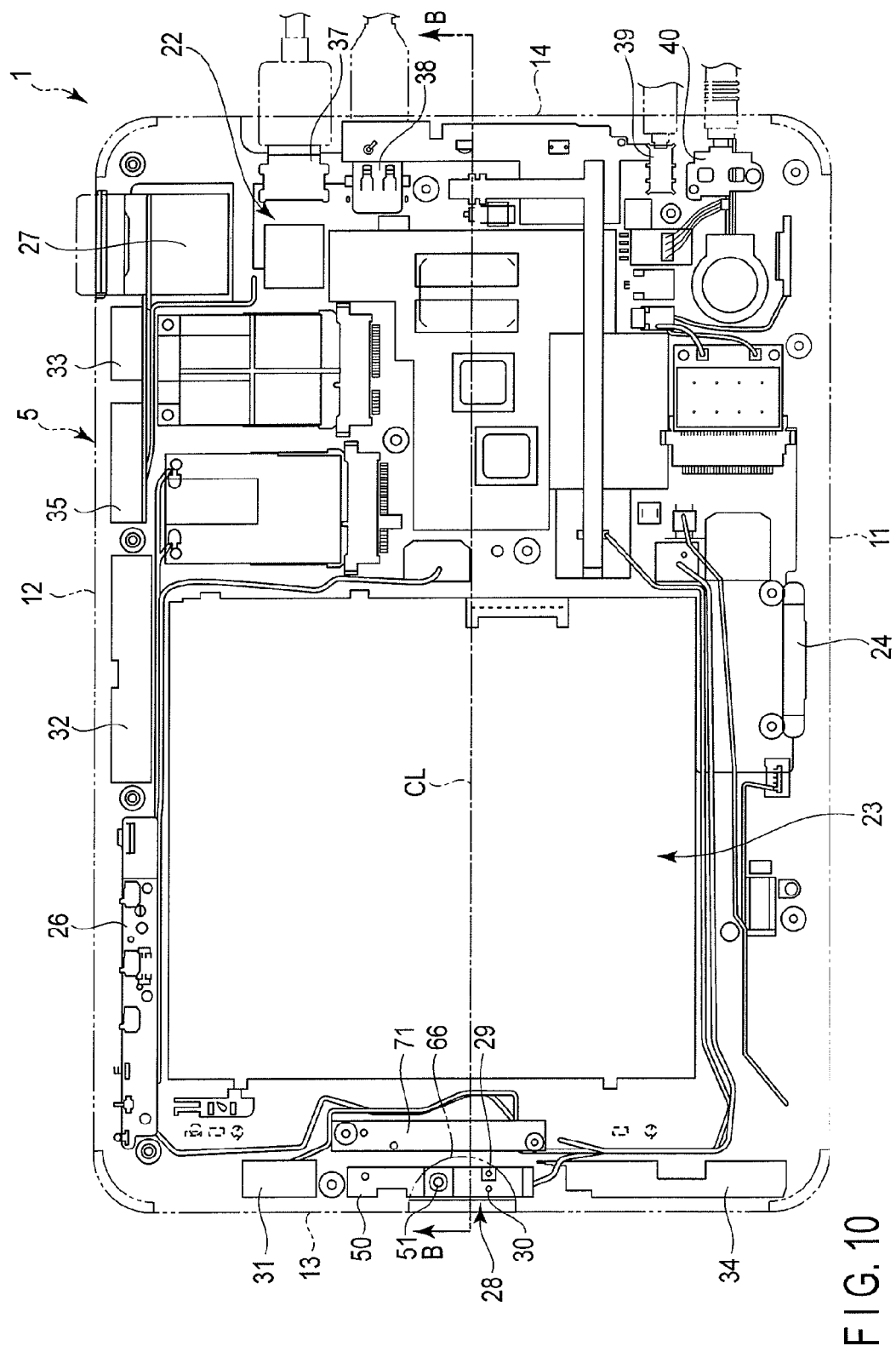
FIG. 10 is an exemplary plan view illustrating the inner part of an electronic apparatus according to a second embodiment.
Figure 11:
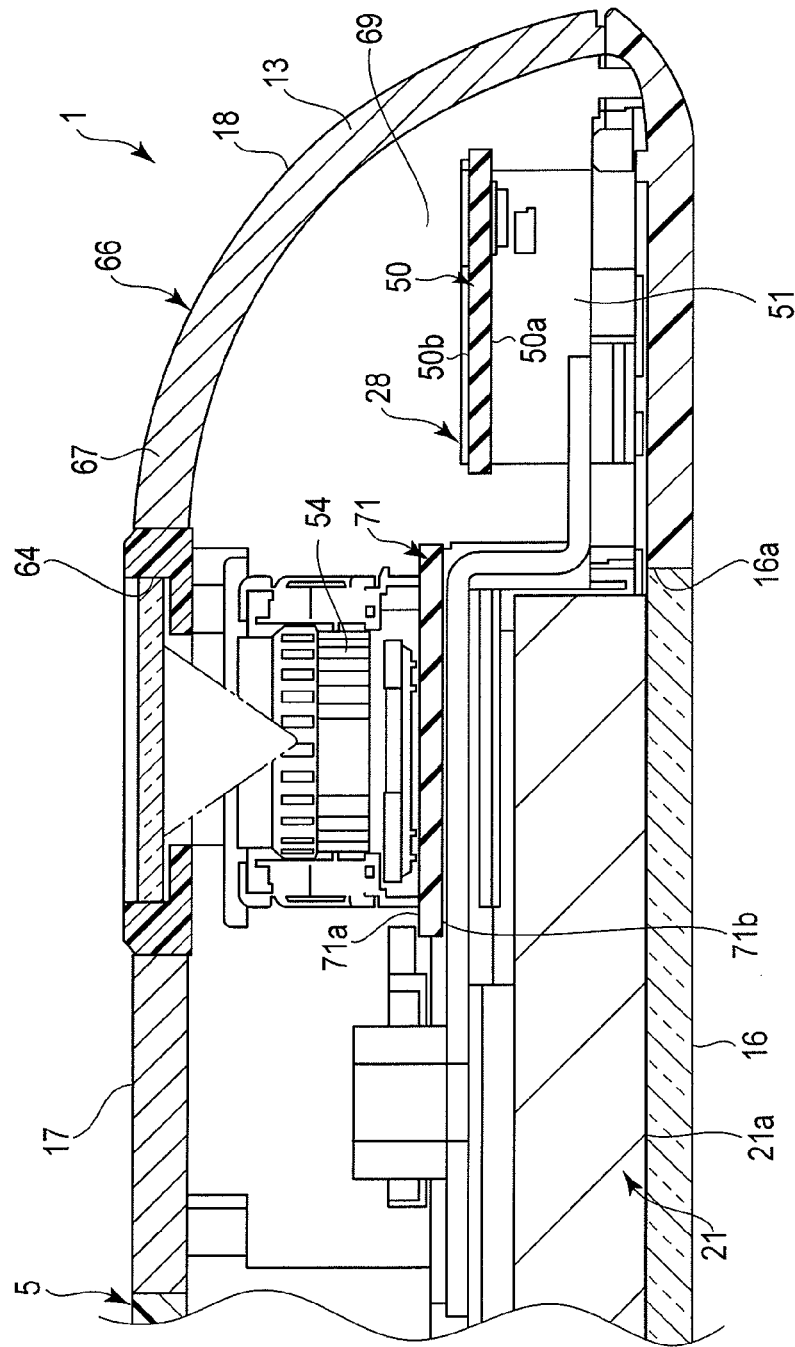
FIG. 11 is an exemplary cross-sectional view taken along the B-B line of the electronic apparatus shown in FIG. 10.

As shown in FIGS. 10 and 11, a camera module 28 of the present embodiment includes a first circuit board 50 (first camera board), a first camera 51, a second circuit board 71 (second camera board), and a second camera 54. That is, the two cameras 51 and 54 are mounted separately on the two circuit boards 50 and 71.

The first circuit board 50 includes a first surface 50a and a second surface 50b opposite to the first surface 50a. The first surface 50a faces the inner surface of the front surface 16 of the housing 5. The first camera 51, the microphone 29, and the LED 30 are mounted on the first surface 50a.

The second circuit board 71 includes a first surface 71a and a second surface 71b opposite to the first surface 71a. The second surface 71b faces a display 21. The first surface 71a faces the inner surface of the back surface 17 of the housing 5. The second camera 54 is mounted on the first surface 71a.

As shown in FIG. 10, the first circuit board 50, the second circuit board 71, and the second camera 54 are disposed at the substantially center portion between the first and second end portions 11 and 12 of the housing 5. That is, the first circuit board 50, the second circuit board 71, and the second camera 54 are disposed at the substantially center portion in the height direction of the housing 5 when the housing 5 is held on the dock 2.

On the other hand, the first camera 51, the microphone 29, and the LED 30 are eccentrically positioned with respect to the center portion between the first and second end portions 11 and 12 of the housing 5. The first camera 51 is eccentrically positioned with respect to the center portion of the housing 5 as being shifted toward the side opposite to the first end portion 11 where a docking connector 24 is provided. Specifically, the first camera 51 is eccentrically disposed, in the first circuit board 50, with respect to the center portion between the first and second end portions 11 and 12 as being shifted toward the second end portion 12.

The microphone 29 and the LED 30 are eccentrically disposed, in the first circuit board 50, with respect to the center portion between the first and second end portions 11 and 12 as being shifted toward the first end portion 11. That is, the central line CL of the housing 5 passes between the microphone 29 and LED 30, and the first camera 51.

FIG. 11 is a cross-sectional view of the housing 5 taken along the central line CL. As shown in FIG. 11, the first camera 51 is provided in the fan-shaped portion 69 and is disposed between the front surface 16 and the circumferential surface 18. The second camera 54 is disposed at a position apart from the fan-shaped portion 69. That is, the second camera 54 is disposed between the front surface 16 and the back surface 17. The second camera 54 is provided at a position away from the curved circumferential surface 18. The second camera 54 is disposed between the back surface 17 of the housing 5 and the display 21.

According to such a configuration, similarly to the first embodiment, the imaging position of the camera can be optimized.

The embodiments are not limited to the embodiments described above but may be realized by modifying constituent elements in the implementing step within a range without departing from the spirit of the invention. Moreover, various embodiments can be made by appropriately combining a plurality of constituent elements disclosed in the embodiments described above. For example, some constituent elements may be omitted from all the constituent elements disclosed in the embodiments. Furthermore, constituent elements in different embodiments may be combined appropriately.

For example, in the first embodiment, the second camera 54 may be disposed between the back surface 17 of the housing 5 and the display 21. In the second embodiment, the second camera 54 may be disposed in a region where it does not overlap the display 21.

The mounting position of the microphone 29 or the LED 30 is not limited to the embodiments described above. The microphone 29 or the LED 30 may be eccentrically disposed on the same side as the first camera 51 as being shifted from the center portion of the housing 5. Moreover, the microphone 29 or the LED 30 may be omitted appropriately.

The second camera 54 may be disposed in the fan-shaped portion 69 between the front surface 16 and the circumferential surface 18. The first and second cameras 51 and 54 may be provided in the fourth end portion 14 which corresponds to the right end portion of the housing 5. The antennas 31, 32, 33, 34, and 35 and the connectors 36, 37, 38, 39, and 40 are not essential components.

The electronic apparatus 1 may be one which is held on the dock 2 in a state where the longitudinal direction of the housing 5 is oriented vertically. In this case, the first and second cameras 51 and 54 may be provided in the first end portion 11 or the second end portion 12 of the housing 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display comprising a display screen;
a housing associated with the display, the housing comprising a first surface configured to expose the display screen, a second surface opposite to the first surface, a first end portion extending in a longitudinal direction of the housing and configured to be at least temporarily attached to a dock, a second end portion opposite to the first end portion a third end portion extending in a direction crossing with the first end portion, and a fourth end portion opposite to the third end portion;
a battery facing the display on a side opposite to the display screen, the battery located closer to the third end portion than to the fourth end portion in the housing;
the first end portion comprising a docking connector configured to be attached to the dock;
a first camera configured to capture an image from the first surface, the first camera located closer to the third end portion in the housing than the battery;
a circuit board attached to the first camera, the circuit board located closer to the third end portion in the housing than the battery; and
a second camera configured to capture an image from the second surface, the second camera located closer to the third end portion in the housing than the battery; and
a connecter exposed from the fourth end portion of the housing, the connecter different from the docking connector,
wherein the circuit board and the second camera are located substantially in a center portion between the first end portion and the second end portion, and
wherein the first camera is eccentrically located on the circuit board with respect to the center portion between the first end portion and the second end portion, wherein the first camera is located closer to the second end portion than the first end portion.

2. The electronic apparatus of claim 1, wherein the circuit board comprises a microphone configured to collect sound from the first surface, wherein the microphone is eccentrically located on the circuit board with respect to the center portion between the first end portion and the second end portion, wherein the microphone is located closer to the first end portion than the second end portion.

3. The electronic apparatus of claim 1, further comprising a flexible printed circuit board connecting the second camera and the circuit board.

4. The electronic apparatus of claim 1,
wherein the second surface is smaller than the first surface, and the housing further comprises a curved third surface connecting the first surface and the second surface, and
the first camera is located between the first surface and the third surface, and the second camera is located between the first surface and the second surface.

5. The electronic apparatus of claim 4, wherein the second camera is larger than the first camera.

6. The electronic apparatus of claim 1,
further comprising a plurality of connectors comprising the connector, which is different from the docking connector,
wherein the plurality of connectors are located in the fourth end portion.

7. The electronic apparatus of claim 1, wherein the second end portion comprises a plurality of antennas in the second end portion, wherein the second end portion is configured as an upper end portion of the housing when the housing is on the dock.

8. An electronic apparatus comprising:

a display comprising a display screen;

a housing associated with the display, the housing comprising a surface configured to expose the display screen, a first end portion extending in a longitudinal direction of the housing and configured to be at least temporarily attached to a dock, a second end portion opposite to the first end portion, a third end portion extending in a direction crossing with the first end portion, and a fourth end portion opposite to the third end portion;

a battery facing the display on a side opposite to the display screen, the battery located closer to the third end portion than to the forth end portion in the housing;

the first end portion of the housing comprising a first connector configured to be attached to the dock;

a camera configured to capture an image from the surface of the housing, the camera located closer to the third end portion in the housing than the battery and eccentrically positioned with respect to a center portion of the housing, wherein the camera is located closer to a side opposite to the first end portion of the housing; and a second connector exposed from the fourth end portion of the housing, the second connector different from the first connector.

* * * * *